3,207,732
COPOLYMERS OF ETHYLENE AND N-METHYL-N-VINYLACETAMIDE
John W. Lynn, Charleston, W. Va., assignor to Union Carbide Corporation, a corporation of New York
No Drawing. Filed Aug. 7, 1961, Ser. No. 129,573
3 Claims. (Cl. 260—88.1)

This invention relates to novel solid copolymers of ethylene and N-methyl-N-vinylacetamide.

The copolymers of this invention contain polymerized ethylene units and N-methyl-N-vinylacetamide units having the following structural formulae:

and

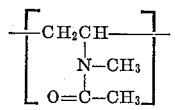

In general, these final copolymers have from 5 to 99 weight percent of combined N-methyl-N-vinylacetamide and from 1 to 95 weight percent of combined ethylene. The copolymers are solid, tough, flexible, and transparent over the entire composition range, with the degree of crystallinity and modulus of elasticity decreasing with increasing amounts of combined N-methyl-N-vinylacetamide. The ethylene/N-methyl-N-vinylacetamide copolymers having about 10 percent combined N-methyl-N-vinylacetamide are solids which are clear and flexible and can be used to produce draperies, wall-coverings, garment bags, shower curtains, and upholstery fabrics. Those copolymers containing about 20 percent combined N-methyl-N-vinylacetamide are clear, solid elastomers which are useful to produce wrapping films for frozen foods and poultry. Copolymers containing about 40 percent combined N-methyl-N-vinylacetamide provide films having improved impact strength over existing films and are useful for packaging toys, sporting goods, and finished laundry. The copolymers that contain more than about 70 percent of combined N-methyl-N-vinylacetamide are water soluble and are useful as adhesives and for the preparation of film-forming emulsions by incorporating them in an aqueous medium.

Of particular interest are those copolymers having from about 10 weight percent to about 50 weight percent polymerized N-methyl-N-vinylacetamide and about 90 to about 40 weight percent polymerized ethylene, since they find particular utility as a safety-glass interlayer.

In general, the copolymers of this invention have specific viscosities varying from about 0.1 to about 0.7, or higher, as measured at 80° C. from a solution containing 0.4 gram of copolymer in 100 milliliters of methylcyclohexane. The copolymers having specific viscosities of from about 0.2 to about 0.5 are particularly useful for packaging films.

The copolymers of this invention have densities of from about 0.91 to about 0.95 gram per cubic centimeter with densities of about 0.92 to about 0.94 gram per cubic centimeter preferred, and have melt indexes of from about 0 to about 1000 decigrams per minute or more, with melt indexes of from about 0 to about 500 decigrams per minute preferred.

The copolymers of this invention are produced by conventional high pressure polymerization processes previously employed for the homopolymerization of ethylene, and can be batch, semi-continuous, or continuous polymerization processes using stirred autoclaves, tubular reactors, or the like. The copolymerization of ethylene with N-methyl-N-vinylacetamide is carried out in the presence of a free-radical catalyst.

The ethylene concentration in the charge can vary from about 5 percent to about 95 percent of the total weight of the comonomers, and preferably from about 55 to about 95 percent of the weight of comonomers. The N-methyl-N-vinylacetamide concentration in the charge can vary from about 5 percent to about 95 percent of the total weight of the comonomers, and preferably from about 45 to about 5 percent.

By "free-radical catalyst" is meant a catalyst which forms a free-radical under the polymerization conditions employed, and includes compounds having an —O—O— or —N=N— linkage. Such catalysts include oxygen, hydrogen peroxide, acyl and aroyl peroxides, such as benzoyl hydroperoxide, acetyl hydroperoxide, lauroyl-hydroperoxide, dibenzoyl peroxide, acetyl benzoyl peroxide, and the like; alkyl peroxides, such as dimethyl dioxide, diethyl dioxide, dipropyl dioxide, propyl methyl dioxide, propyl ethyl dioxide, tert-butyl hydroperoxide, di-tert-butyl peroxide, and the like, other per-oxygen compounds, such as alkali metal persulfates, perborates, and percarbonates, isopropyl percarbonate, and the like; and azo compounds, such as azobisisobutyronitrile, azobis-2-phenylacetonitrile, azobis-2,2 - diphenylacetonitrile, and the like; and mixtures thereof.

The catalyst concentration in the charge can vary from about 0.0001 weight percent to about 5 weight percent, based on the combined weight of the comonomers charged, with from about 0.001 weight percent to about 1 weight percent of the peroxide or azo catalyst and from 0.002 weight percent to about 0.01 weight percent when oxygen is the catalyst preferred.

The copolymerization can be conducted in the presence of diluents which enable uniform temperature control throughout the reaction mixture, although a diluent is not essential. When a diluent is employed, it can be present in amounts up to about 200 weight percent or more, based upon the weight of comonomers. Quantities greater than 200 weight percent, based on the weight of the comonomers, are preferably not employed, however, for such quantities result in reduced productivities for the polymerization. Water can be employed as the diluent. In addition, organic compounds that are normally liquid at the reaction conditions can be employed as diluents, either alone or in combination with water in a weight ratio of organic compound to water of from about 1:2 to about 1:3. Suitable organic compounds include pentane, isooctane, methanol, tertiary-butanol, cyclohexane, methylcyclohexane, butyl acetate, benzene, toluene, chlorobenzene, and the like, and mixtures thereof.

The copolymerization can be conducted at pressures of from about 900 p.s.i.g. to 100,000 p.s.i.g. or more, with pressures of from about 15,000 p.s.i.g. to about 50,000 p.s.i.g. preferred.

The copolymerization can be conducted at temperatures of from about 40° C. to about 400° C. Preferred temperatures are from about 70° C. to about 225° C.

The copolymers of this invention are recovered from the copolymerization mixture by methods known to those skilled in the art. For example, where water is the reaction medium, the water-insoluble copolymers which contain up to about 70 weight percent of combined N-methyl-N-vinylacetamide can be recovered from the reaction mixture after polymerization by employing conventional solid-liquid separation procedures, such as by filtration, centrifugation, and the like. The water-soluble copolymers which contain more than 70 weight percent of combined N-methyl-N-vinylacetamide can be recovered as a residue after distilling or evaporating off the water.

The following examples are illustrative:

EXAMPLES 1–14

A stainless steel-lined, stirrer-equipped autoclave having a volume of 1480 cc. was evacuated and 400 grams of water, 200 grams of t-butanol, 41 grams of N-methyl-N-vinylacetamide, and 1.0 gram of azobisisobutyronitrile were charged to the autoclave. The reaction vessel was purged three times with ethylene and then pressured to 5,000 p.s.i.g. with deoxygenated ethylene while agitating the reaction mixture. The reaction mixture was heated to 70° C. and the ethylene pressure was increased to 15,000 p.s.i.g. The reaction was carried out at 70–74° C. for a period of 55 minutes, during which time the pressure was maintained at 14,000–15,000 p.s.i.g. by periodic injection of ethylene. After the reaction was complete, as determined by the cessation of the consumption of ethylene, the autoclave was cooled and the pressure released. The reaction mixture was removed from the autoclave and filtered. There was recovered a solid ethylene/N-methyl-N-vinylacetamide copolymer which weighed 82 grams and which contained 12.95% of combined N-methyl-N-vinylacetamide, as determined by nitrogen analysis.

Plaques of the resin 1¼ inches in diameter and 3 mils thick which were molded at 150–160° C. and 1000 p.s.i. were clear and had excellent toughness. The glass transition point of the copolymer was −10° C., as determined by stiffness-temperature measurements. The melting point of the copolymer was 95° C.

Employing procedures similar to that described above, additional copolymers of ethylene and N-methyl-N-vinylacetamide were prepared containing from 10 to 97 percent of combined N-methyl-N-vinylacetamide. In addition to azobisisobutyronitrile, catalysts that were employed were isopropyl percarbonate, dibenzoyl peroxide, and a potassium persulfate-sodium bicarbonate mixture. The polymerizations were conducted using as a diluent, water alone, or water-tertiary-butanol, or water-benzene mixtures. For convenience, the reaction conditions and resin properties of the resulting copolymers are set forth in Table A.

The physical properties of the copolymers reported in Table A were determined according to the following procedures:

(1) Melt index was determined according to ASTM D1238–57T (1958) at a pressure of 43.1 p.s.i. and a temperature of 170° C. and is reported as decigrams per minute.

(2) Flow rate was determined according to ASTM D1238–57T (1958) at a pressure of 205 p.s.i. and a temperature of 170° C. and is reported as decigrams per minute.

(3) Specific viscosity was determined with a solution of 0.4 gram of the copolymer in 100 milliliters of methylcyclohexane at 80° C. using an Ubbelhode viscometer.

(4) Reduced viscosity was determined with a solution of 0.2 gram of the copolymer in 100 milliliters of cyclohexanone at 30° C. using an Ubbelhode viscometer.

TABLE A.—COPOLYMERIZATION OF ETHYLENE AND N-METHYL-N-VINYLACETAMIDE
[Stirred Autoclave]

| Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Charge: | | | | | | | | | | | | | | |
| N-methyl-N-vinyl-acetamide, grams | 41 | 41 | 82 | 82 | 235 | 364 | 471 | 603 | 39.9 | 83.4 | 36.3 | 76.4 | 39.9 | 39.5 |
| Ethylene, grams | 369 | 369 | 328 | 328 | 235 | 196 | 157 | 67 | 359 | 334 | 327 | 306 | 359 | 356 |
| t-Butanol, grams | 200 | 200 | 200 | 200 | 200 | 200 | 200 | 200 | | | | | | |
| Benzene, grams | | | | | | | | | 600 | 600 | | | | |
| Water, grams | 400 | 400 | 400 | 400 | 400 | 400 | 428 | 400 | | | 800 | 800 | | 800 |
| Catalyst* | ABBN | ABBN | ABBN | ABBN | ABBN | ABBN | ABBN | ABBN | ABBN | ABBN | IPP | IPP | DBP | PP/SB |
| Weight, grams | 1 | 1 | 1 | 1 | 1 | 1 | 1 | 1 | 1 | 1 | 0.35 | 0.35 | 1 | 1.25/1.56 |
| Polymerization conditions: | | | | | | | | | | | | | | |
| Temperature, °C | 70 | 70 | 70 | 70 | 70 | 62 | 70 | 70 | 70 | 70 | 40 | 40 | 70 | 70 |
| Operating time, hours | 1 | ⅚ | 1⅙ | 1½ | 2 | ⅓ | 3 | 4¼ | 5 | 3½ | 14 | 13 | 3¾ | 12 |
| Production data: | | | | | | | | | | | | | | |
| Copolymer weight, grams | 82 | 138 | 82 | 79 | 100 | 294 | 177 | 70 | 27 | 23 | 8.4 | 5 | 8 | 0.91 |
| Conversion, percent | 16.6 | 34.4 | 20.3 | 19.8 | 29.7 | 23.0 | 7.43 | 19.8 | 5.86 | 5.45 | 1.93 | 1.1 | 2.0 | 0.23 |
| Copolymer properties: | | | | | | | | | | | | | | |
| Nitrogen, weight percent | 1.83 | 1.50 | 2.95 | 3.07 | 9.27 | 11.48 | 12.91 | 13.97 | 1.79 | 3.19 | 1.48 | 1.64 | 1.53 | |
| Combined N-methyl-N-vinylacetamide, weight percent | 12.95 | 10.6 | 20.9 | 21.7 | 65.6 | 81.1 | 91.4 | 97.0 | 12.66 | 22.6 | 10.5 | 11.6 | 10.8 | |
| Melt index, decigrams per minute | 0.068 | 8.32 | 2.71 | 0.47 | 0.910 | 0 | | | 406 | 410 | | | | |
| Flow rate, decigrams per minute | 0.99 | 45.0 | 34.0 | 6.4 | 11.8 | 0 | | | | | | | 0.162 | 0.145 |
| Specific viscosity | 0.59 | 0.403 | 0.376 | 0.425 | | | | | | | | | | |
| Reduced viscosity | | | | | 0.757 | 0.560 | 0.391 | 0.206 | | | | | | |
| Solubility in water | No | No | No | No | No | Yes | Yes | Yes | No | No | No | No | No | |

*Azobisisobutyronitrile—ABBN. Isopropyl percarbonate—IPP. Dibenzoyl peroxide—DBP. Potassium persulfate/sodium bicarbonate—PP/SB.

EXAMPLES 15-20

Ethylene containing 48 parts per million of oxygen was mixed with N-methyl-N-vinylacetamide to give a mixture containing 23 weight percent of N-methyl-N-vinylacetamide and 77 weight percent of ethylene. To this mixture were added 188 parts per million, based upon the total weight of comonomers, of azobisisobutyronitrile. The resulting mixture was fed continuously at a pressure of 35,000 p.s.i.g. to a tubular reactor having a jacket temperature of 140° C. The feed was continued for 30 minutes. There were produced 467 grams of an ethylene/N-methyl-N-vinylacetamide copolymer having 16.7 weight percent of polymerized N-methyl-N-vinylacetamide and 83.3 weight percent of polymerized ethylene.

Employing procedures similar to that described above, additional copolymers of ethylene and N-methyl-N-vinylacetamide were prepared in the tubular reactor substituting di-tert-butyl peroxide for azobisisobutyronitrile in certain instances. When di-tert-butyl peroxide was employed the jacket temperature was 160° C. instead of 140° C.

Employing test procedures similar to those described for Examples 1-14, the physical properties of the ethylene/N-methyl-N-vinylacetamide copolymers thus produced were measured, except that the melt index and the flow rate of the ethylene/N-methyl-N-vinylacetamide copolymers were determined at 190° C. rather than 170° C. In addition, the density, the stiffness modulus, the tensile strength, the percent elongation, and the percent recovery after extensions of 50 percent and 100 percent were measured according to the following procedures:

(1) Density was determined according to ASTM D1505-57T and is reported as grams per cubic centimeter.

(2) Tensile strength and percent elongation were determined according to ASTM D882-56T and are reported as pounds per square inch and percent, respectively.

(3) Stiffness modulus was determined by longitudinally stretching a "dog-bone" shaped plaque of copolymer having a 20-mil by ¼-inch across-section at the narrowest point in an Instron tester at a rate of 10 percent per minute to a total extension of 1 percent.

The stiffness is 100 times the force required to achieve the 1 percent extension and is reported in pounds per square inch.

(4) Percent recovery was determined by stretching a plaque of the copolymer in an Instron tester to 100 percent or 50 percent extensions and then allowing the sample to relax, the percent recovery being determined immediately after relaxation.

The charge concentrations, feed rates, production data, and properties of these copolymers are set forth in Table B, with the above-described example included as Example 15.

TABLE B.—COPOLYMERS OF ETHYLENE AND N-METHYL N-VINYLACETAMIDE

[Tubular reactor]

| Example | 15 | 16 | 17 | 18 | 19 | 20 |
|---|---|---|---|---|---|---|
| Charge: | | | | | | |
| N-methyl-vinylacetamide, weight percent of comonomers | 23 | 18 | 15 | 21 | 23 | 26 |
| Ethylene, weight percent of comonomers | 77 | 82 | 85 | 79 | 77 | 74 |
| Oxygen, p.p.m. of ethylene | 48 | 38 | 60 | 37 | 40 | 30 |
| Azobisisobutyronitrile, p.p.m. of comonomers | 188 | ------ | 160 | 151 | ------ | ------ |
| Di-t-butyl peroxide, p.p.m. of comonomers | ------ | 271 | ------ | ------ | 204 | 184 |
| Production data: Copolymer yield, grams | 467 | 404 | 468 | 416 | 467 | 35 |
| Copolymer properties: | | | | | | |
| Polymerized N-methyl-N-vinylacetamide, weight percent | 16.7 | 17.3 | 17.6 | 18.75 | 19.25 | 35.3 |
| Melt index, decigrams per minute | 2.3 | 2.46 | 0.425 | 15.12 | 19.72 | 26.4 |
| Flow rate, decigrams per minute | 22.4 | 34.4 | 5.4 | 134 | 234 | ------ |
| Specific viscosity | 0.453 | 0.364 | 0.534 | 0.356 | 0.313 | 0.284 |
| Density, grams per cubic centimeter | 0.9258 | 0.9310 | 0.9292 | 0.9336 | 0.9312 | 0.9386 |
| Stiffness modulus, p.s.i. | 8,507 | 7,589 | 12,172 | 6,610 | 3,555 | 4,556 |
| Tensile strength, p.s.i. | 3,336 | 4,060 | 4,189 | 4,354 | 1,855 | 3,864 |
| Percent elongation | 880 | 990 | 983 | 1,093 | 899 | 975 |
| Percent recovery: | | | | | | |
| After 50% extension | 84.2 | 83.8 | 81.9 | 83.6 | 81.9 | 80.0 |
| After 100% extension | 76.7 | 75.1 | 71.7 | 79.5 | 78.1 | 76.9 |

What is claimed is:

1. A solid copolymer of ethylene and N-methyl-N-vinylacetamide having from 1 to 95 percent of polymerized ethylene and from 99 to 5 percent of polymerized N-methyl-N-vinylacetamide, said copolymer having been produced by the high pressure copolymerization of monomeric ethylene and monomeric N-methyl-N-vinylacetamide in contact with a free-radical catalyst.

2. A solid copolymer of ethylene and N-methyl-N-vinylacetamide having from 50 to 90 percent of polymerized ethylene and from 50 to 10 percent of polymerized N-methyl-N-vinylacetamide, said copolymer having been produced by the high pressure copolymerization of monomeric ethylene and monomeric N-methyl-N-vinylacetamide in contact with a free-radical catalyst.

3. A solid copolymer consisting of polymerized units of ethylene and polymerized units of N-methyl-N-vinylacetamide whose specific viscosity, as determined at 80° C. from a solution containing 0.4 gram of said copolymer in 100 milliliters of methylcyclohexane, is greater than 0.2, said copolymer having been produced by the high pressure copolymerization of monomeric ethylene and monomeric N-methyl-N-vinylacetamide in contact with a free-radical catalyst.

References Cited by the Examiner

UNITED STATES PATENTS

| 2,231,905 | 2/41 | Hanford et al. | 260—89.7 |
| 2,391,920 | 1/46 | Peterson | 260—87.3 |
| 2,395,381 | 2/46 | Squire | 260—87.3 |
| 2,414,311 | 1/47 | Larson | 260—87.3 |
| 2,628,224 | 2/53 | Cairns et al. | 260—89.7 |

OTHER REFERENCES

Schildknecht: Vinyl and Related Polymers, John Wiley and Sons, Inc., New York (1952), pages 659-661.

JOSEPH L. SCHOFER, *Primary Examiner.*

PHILIP E. MANGAN, DONALD E. CZAJA, LEON J. BERCOVITZ, *Examiners.*

UNITED STATES PATENT OFFICE
CERTIFICATE OF CORRECTION

Patent No. 3,207,732                        September 21, 1965

John W. Lynn

It is hereby certified that error appears in the above numbered patent requiring correction and that the said Letters Patent should read as corrected below.

Column 1, line 50, for "40 weight" read -- 50 weight --.

Signed and sealed this 19th day of April 1966.

(SEAL)
Attest:

ERNEST W. SWIDER                      EDWARD J. BRENNER
Attesting Officer                         Commissioner of Patents